Jan. 19, 1932.  J. W. DENNING  1,842,013
SLAT FENCE MACHINE
Filed Dec. 15, 1930  9 Sheets-Sheet 3

Inventor:
J. Wayne Denning
By Thos. A. Denning
Atty.

Patented Jan. 19, 1932

1,842,013

UNITED STATES PATENT OFFICE

J. WAYNE DENNING, OF JOLIET, ILLINOIS

SLAT FENCE MACHINE

Application filed December 15, 1930. Serial No. 502,489.

The present invention has to do with improvements in machines for manufacturing what is known as slat fence,—that is, fence composed of vertical pickets or slats which are joined together by pairs of longitudinally extending strand wires. These pairs of strand wires are twisted or coiled together at positions between the slats; and preferably such twisting or coiling operations are performed alternately in opposite directions.

One of the features of the present invention relates to the provision of an improved construction of sprocket pull-off device by which the woven fence is drawn away from the coilers and slat feeding mechanism. This pull-off mechanism is so constructed and driven that it operates in definite synchronism with respect to the operations of the slat feeding and coiler head operating mechanism. Consequently, the pull-off sprocket rotates through a definite angular distance corresponding to each slat feeding and weaving operation. The exact distance of fence pull will, accordingly, depend upon the exact radius at which the pull is exerted on the woven fence. The inter-twisted or inter-coiled strand wires substantially define the plane of the woven fence; so by providing a machine construction in which these inter-coiled wires are always located an exact radial distance on the sprocket during the pulling operation, the fence will always be pulled the same exact distance for each equal angular travel of the sprocket.

It is therefore an object of the invention to provide a pull-off sprocket construction such that the inter-coiled or inter-twisted portions of the strand wires always lie against teeth or supports of uniform radius, and without any interference from intermediate slats. At the same time, the pull-off sprocket is so constructed that other portions of the teeth serve to exert a direct tangential or angular pressure against the slats at locations between the strand wires, whereby the rotation of the pull-off sprocket itself advances the fence by pressure against the edges of the slats.

The above combination of results is secured by a tooth construction such that the strand wires are properly accommodated by the sprocket teeth at points between the twisted portions and the edges of the slats; such accommodation being provided by bevelling the advancing faces of the teeth at the positions where the inter-twisted strand wires are supported. These bevel portions make it possible for the inter-twisted strand wires to lie square down against the top edges of the teeth, the slats themselves being engaged by other tooth portions for transmitting the necessary pull on the fence. Thus there is assurance that the fence always lies at exactly the same radius at the position where it is being pulled-off. In this way, also, irregularities in the thickness of the different slats do not cause any error in the operation of the pull-off sprocket since the inter-twisted strand wires are the portions which are compelled to assume the proper radius on the sprocket wheel at the pull off position.

Another feature of the invention relates to an improved construction of automatic trip-off device for discontinuing the operation of the machine in case any given slat fails to come to the exact correct position before the coiling operation is performed. This construction is such that a very accurate and reliable machine stopping function is performed under the conditions enumerated above; and at the same time the construction is such that it may be readily tripped or operated by hand if it is desired to cause a manual stopping of the machine.

Another feature of the invention relates to the provision of an improved construction of slat pointing mechanism. This mechanism serves to trim or point the slats during the operation of the machine. Said pointing mechanism operates intermittently on the respective slats in succession, serving to point each slat in turn after said slat has been woven into the fence.

In connection with the foregoing, the pull-off mechanism operates continuously so that the pointing mechanism is so constructed that it advances synchronously with each slat in turn and performs its pointing operation while registered with each consecutive slat. After each such pointing operation the pointer mechanism drops back into position to pick up the next slat, and the operation is then repeated thereon.

This pointer mechanism is provided with means for automatically engaging with each slat and maintaining such engagement during the advancement of the slat and during the pointing operation. Due to the fact that the slats are of varying widths, or that the widths may be purposely changed from time to time, it becomes necessary to provide means for varying or adjusting the center of the pointing mechanism with respect to the different sizes of slats, as otherwise the different sizes of slats will not all be centrally pointed. It is therefore a further object of the invention to provide means for adjusting this centering function of the pointer.

In machines of the general type disclosed herein, the slats are individually advanced lengthwise of themselves into position transversely of the strand wires and between the jaws of the coiler heads, the coiler heads being stationary at such time. This slat feeding mechanism incorporates a rapidly rotating toothed or knurled wheel which is mounted and rotates upon a horizontal axis, said axis extending parallel to the direction of feed of strand wires. This wheel also rotates continuously and the intermittent slat feeds are performed by intermittently raising the individual slats and pressing them into contact with the bottom surface of such feeding wheels. Thereupon the feeding wheel will immediately advance the slat so presented to it into position for weaving into the fabric. This feeding wheel is most conveniently driven by a chain or the like directly from a motor shaft lying parallel to the axis of said feeding wheel.

It is also necessary to provide means for driving the other mechanisms of the machine including the coiler heads, the pull-off sprocket, etc. Such drive is most conveniently performed by a shaft which lies at right angles to the direction of the sprocket feed wheel; and therefore in those cases in which all of the mechanisms are driven by a common motor it is necessary to interpose bevel gears or the like at some positions to take care of this right angular relationship between the parts just explained.

In order to obviate the foregoing bevel gear arrangement and greatly simplify the construction and operation of the entire machine, I have provided two separate driving motors, each having its shaft lying parallel to the shaft which is to be driven thereby and connected thereto by a chain and sprocket drive. This arrangement therefore incorporates a driving motor having its shaft parallel to the slat feeding wheel shaft and connected thereto by a chain and sprocket drive; and it also includes another motor having its shaft lying parallel to the other mechanism drive shaft and connected thereto by chain and sprocket drive, the two motors with their respective chain and sprocket drives lying at right angles to each other.

Another feature in connection with machines of this type is the intermittent back and forth rotation of the coiler heads, first in one direction and then in the other. These coiler heads are all driven by a common rack-bar which functions upon individual gears on the respective coiler heads, and by intermittently shifting the rack-bar back and forth the coiler heads are turned first in one direction and then in the other intermittently, with suitable periods of rest between the reversals of movement.

Mechanisms of the foregoing type are subject to severe pounding, and experience has demonstrated that there is rapid deterioration of these intermittently operated parts due to the size of the forces which must be transmitted and in comparison with the rapidity of the starting and stopping and direction reversing functions.

Another object of the invention therefore is to greatly reduce the shock and vibration of parts in these movements; and I have accomplished such result by associating a shock absorber of familiar type with the rack bar or rack bar operating mechanism. This association of parts is so arranged that the shock absorber comes into operation shortly before the end of the movement in either direction takes place, thereby smoothly slowing down the parts and bringing them to rest without shock.

Another feature of the invention relates to the provision of means for automatically painting the completed fence as it is delivered from the pull-off sprocket. This painting mechanism operates in timed relationship to the fence operations, and serves to cause the completed fence to move through a paint bath from which it emerges and is then delivered to the bundle winding mechanism.

The paint used for this class of work usually incorporates a pigment such as red oxide of iron or the like sustained in a water bath. This class of material must be kept in agitation in order to prevent the pigment from settling out of the bath. It is therefore a further object of the invention to provide an agitator in the lower portion of the bath, which agitator is constantly in rotation as long as the machine is in operation.

The agitator is located in the bottom of the paint vat so that it will most effectively pick up and return into the body of the bath any pigment settling towards the bottom. In order to prevent the fence from finding its way down into this rotary agitator in case of breakage of the fence or otherwise, I have provided suitable baffles or shields across the body of the vat and between the positions of the rotary agitator and the travelling fence, which baffles will serve to prevent the fence from becoming entangled with the agitator.

Other objects and uses of the invention will appear from a detailed description of the same, which consists in the features of construction and combinations of parts hereinafter described and claimed.

In the drawings:

Figure 4 shows a perspective view of the principal parts of the stopping mechanism dissociated from the remaining positions of the machine;

Figure 5 shows a fragmentary section on the line 5—5 of Figure 4, looking in the direction of the arrows and on enlarged scale;

Figure 6 shows a cross section through the pull-off sprocket showing in detail the form of the sprocket teeth by which the strand wires are radially positioned at the correct radius while the tangential forces are communicated to the intermediate slats, and Figure 6 is a fragmentary cross section on the line 6—6 of Figure 1, looking in the direction of the arrows;

Figure 18 shows a fragmentary side view of the snubber mechanism for controlling the operation of the rack bar, being taken substantially on the line 18—18 of Figure 1, looking in the direction of the arrows.

The machine herein disclosed is provided with a suitable frame, the detailed construction of which may of course be modified to meet the needs of the particular machine in question. This frame is conveniently provided with longitudinal side rails 20 and 21, joined by end rails 22 and 23. The frame is supported by feet or pedestals such as 24 located at convenient places to carry the weight and avoid undue deflection of the frame.

Figure 1:
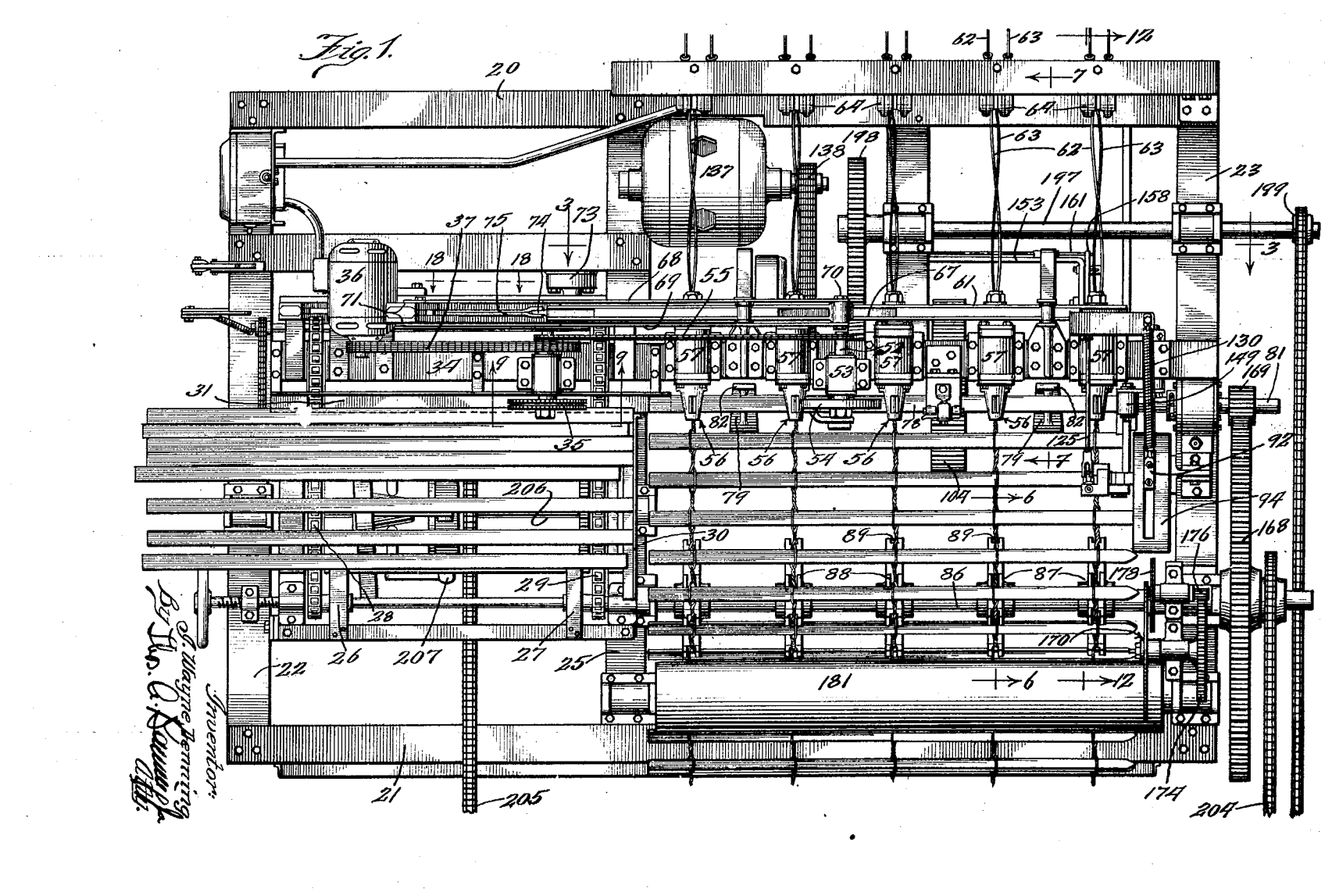
Figure 1 shows a plan view of a slat fence machine embodying the features of the present invention, the paint vat and parts being eliminated in order to shorten up the figure.

Preferably also there is a transverse frame member 25 best shown in Figure 1. The space to the left thereof is substantially occupied by the slat table and the slat delivering mechanism, whereas the space to the right of the rail 25 is substantially occupied by the weaving and pull-off and painting and pointing and other mechanisms. This table at the left hand side of the machine includes bars 26 and 27, upon which the loose slats may be initially dumped, and chains 28 and 29 travel away from said bars towards the slat feeding mechanism and thus tend to carry the slats towards said feeding mechanism. Generally an end stop or aligner bar 30 is provided substantially above the position of the frame member 25 and serve as an end stop against which the ends of the slats rest as they advance towards the feeding mechanism.

Figures 9, 10, 11, 19:
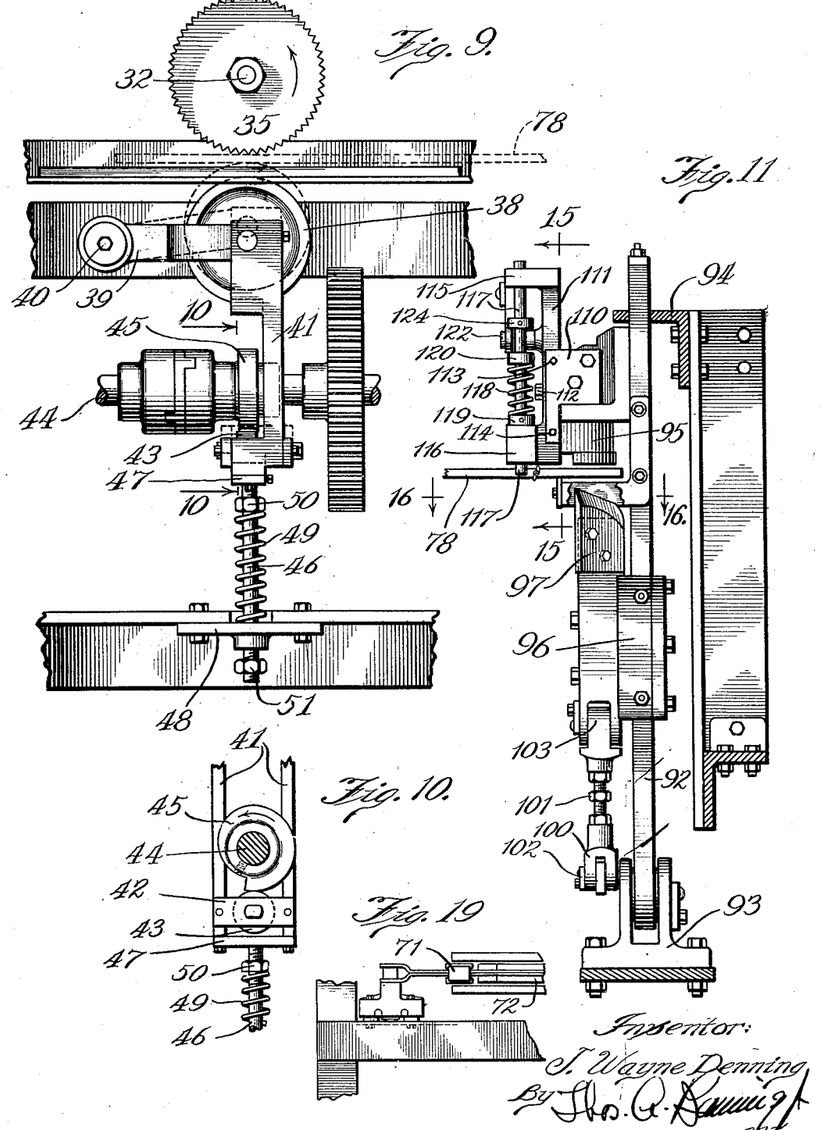
Figure 9 shows a fragmentary section on the line 9—9 of Figure 1, looking in the direction of the arrows, and it illustrates the slat feeding mechanism by means of which the individual slats are moved lengthwise into position between the jaws of the coiler heads.
Figure 10 shows a fragmentary view on the line 10—10 of Figure 9, looking in the direction of the arrows, and it shows the cam arrangement by means of which the operation of the toothed wheel of Figure 9 is intermittently controlled.
Figure 11 is an edge view of the slat pointing mechanism and adjacent parts in the position which they occupy in Figure 12 at the beginning of a pointing operation.
Figure 19 shows a fragmentary plan view corresponding to Figure 18.

The details of the slat feeding mechanism are best shown in Figure 9. At the end of the travel of the slats under the impulse of the chains 28 and 29 there is located a stop bar 31, conveniently made in the form of an angle with one of its flanges standing up in position to limit the movement of the slat. Extending across this stop bar 31 is a shaft 32 (see Figure 9), said shaft being journaled in the box 33 on the frame bar 34 (see Figure 1). On the front end of the shaft 32 is mounted a serrated wheel 35 which thus rotates on a fixed center directly above the stop bar 31 and therefore directly above a slat resting on said stop bar.

A driving motor 36 is mounted on a bracket in such position that it directly drives the shaft 32 through the medium of a chain 37 and suitable sprockets on the motor shaft and on the shaft 32, such drive being effected without the necessity of using either spur or bevel gears. Thus the serrated wheel 35 always rotates at uniform speed in the same direction as indicated by the arrow in Figure 9.

The bar 31 is slotted or open at a position beneath the wheel 35; and there is a lift wheel 38 located directly beneath the wheel 35 as shown in Figure 9. Said lift wheel 38 is journaled on the end of an arm 39 which is pivoted to a frame bar at the point 40. The outer end of the arm 39 is connected to a bifurcated member 41, which bifurcated member extends down and has a cross piece 42 at its lower end. A roller 43 is journaled to this cross piece as shown in Figure 10.

The bifurcations 41 embrace between them a shaft 44 which is driven uniformly during the normal operation of the machine; and a cam block 45 is located on said shaft 44 in position to engage the roller 43 as shown in Figure 10. Thus the rotation of the shaft and cam block of Figure 10 in the direction of the arrow will serve to periodically pull down the bifuricated member 41 by engagement with the roller 43. There is a pin 46 extending down from another cross piece 47 on the lower ends of the bifurcations 41, and said pin 46 works through a bracket 48 carried by a frame member of the machine. A spring 49 surrounds the pin 46 and presses up against an adjustment nut 50 on said pin so that by adjusting said nut the force of the spring can also be adjusted. This will regulate the pressure exerted by the roller 38 on the up-stroke against the slat. If desired, a stop nut 51 may be placed on the lower end of the pin 46 so as to limit excessive upward movement of the parts.

The cam block 45 is so shaped that each time it completes a revolution the bifurcated member 41 is allowed to be suddenly impelled upwards so as to lift the slat resting above the roller 38 and force said slat against the serrated wheel 35. Due to the rapid rotation of this wheel the slat will be projected towards the right in Figure 9 and thus carried over into the weaving position of Figure 1. In this connection it is noted that the operation of the serrated wheel or roller 35 is continuous and due to the operation of its own independent motor.

Preferably there is another shaft 52 journaled in the block 53 parallel to the shaft 32 and located in the right-hand or weave portion of the machine. This shaft 52 when used is provided with a friction disk 54 of proper size and position to contact the top surface of the slat after said slat has been projected to the right and thus exert a continuous pressure on said slat towards the right of the machine. This shaft 52 may be driven from the shaft 32 by a chain 55 and sprockets on the shafts so that the rotation of the disk 54 is harmonious and continuous with that of the disk 35.

Figure 12:
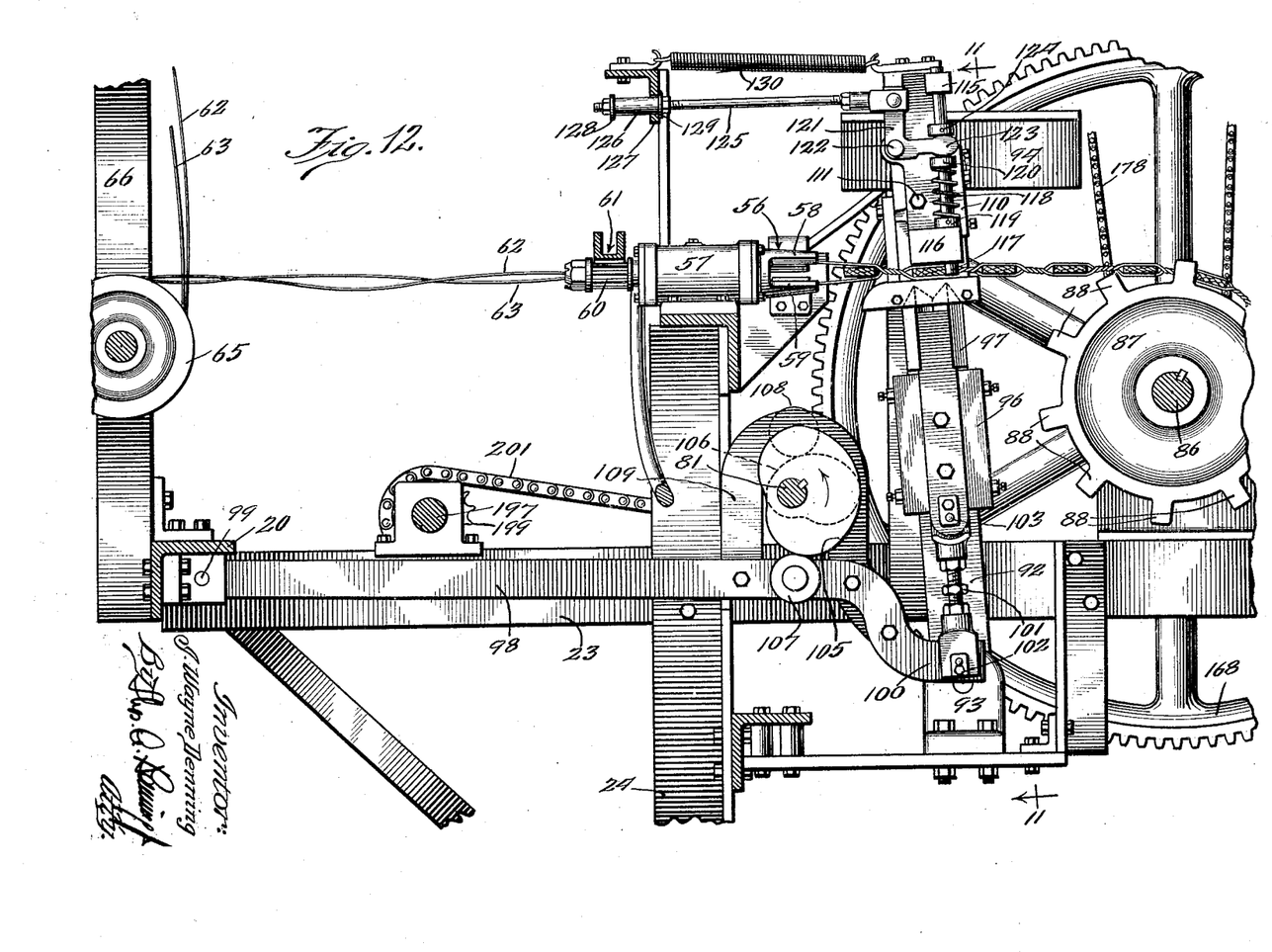
Figure 12 is a cross section on the line 12—12 of Figure 1, looking in the direction of the arrows, showing the pointing mechanism and associated parts at the position which they occupy at the beginning of their movement.
Figure 13:
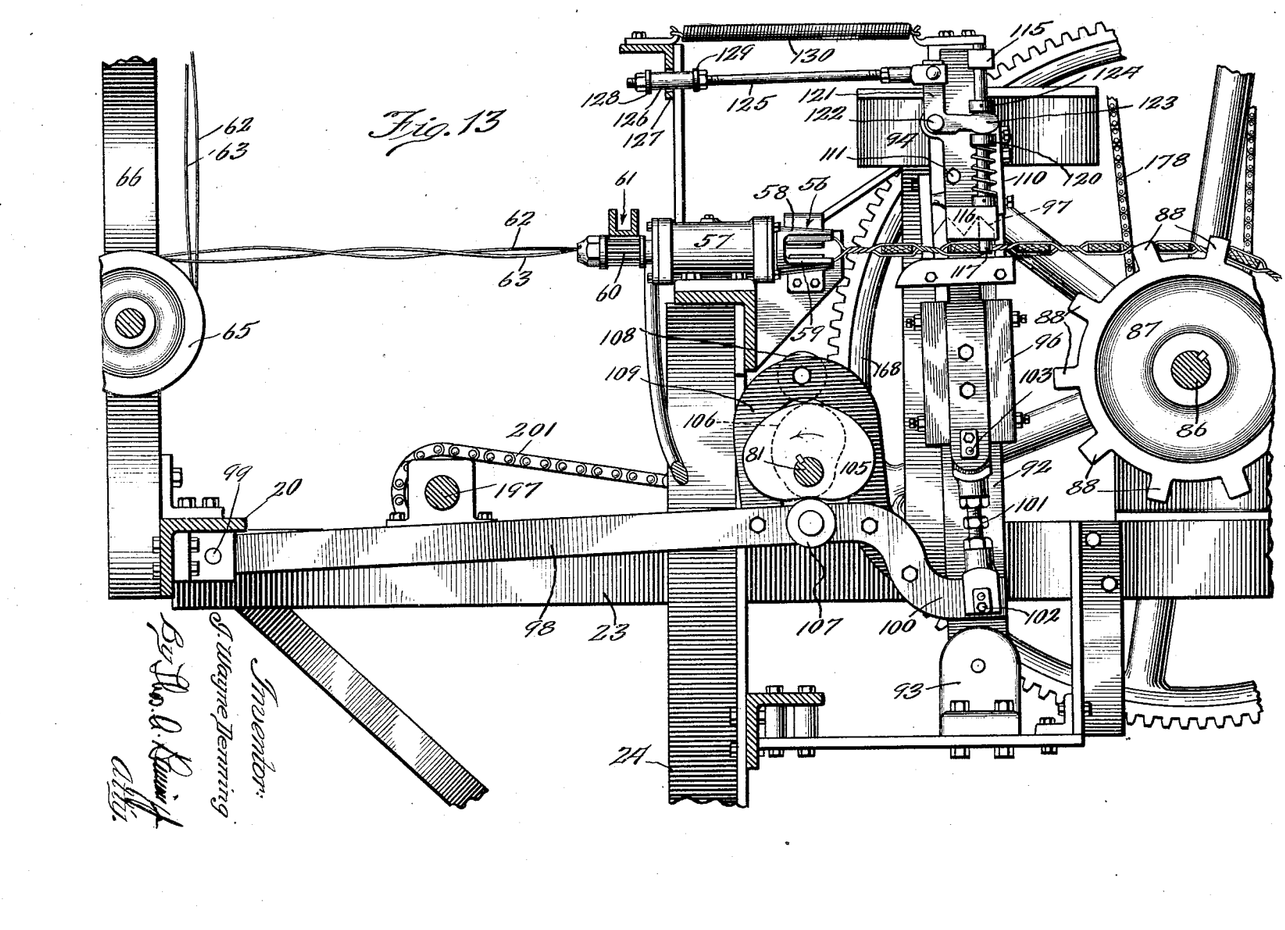
Figure 13 shows a view similar to that of Figure 12 with the exception that the fencing has advanced from the position of Figure 12 and the cutter of the pointer has been forced up so as to trim the picket or slat, the pointer being still engaged with the slat.
Figure 14:
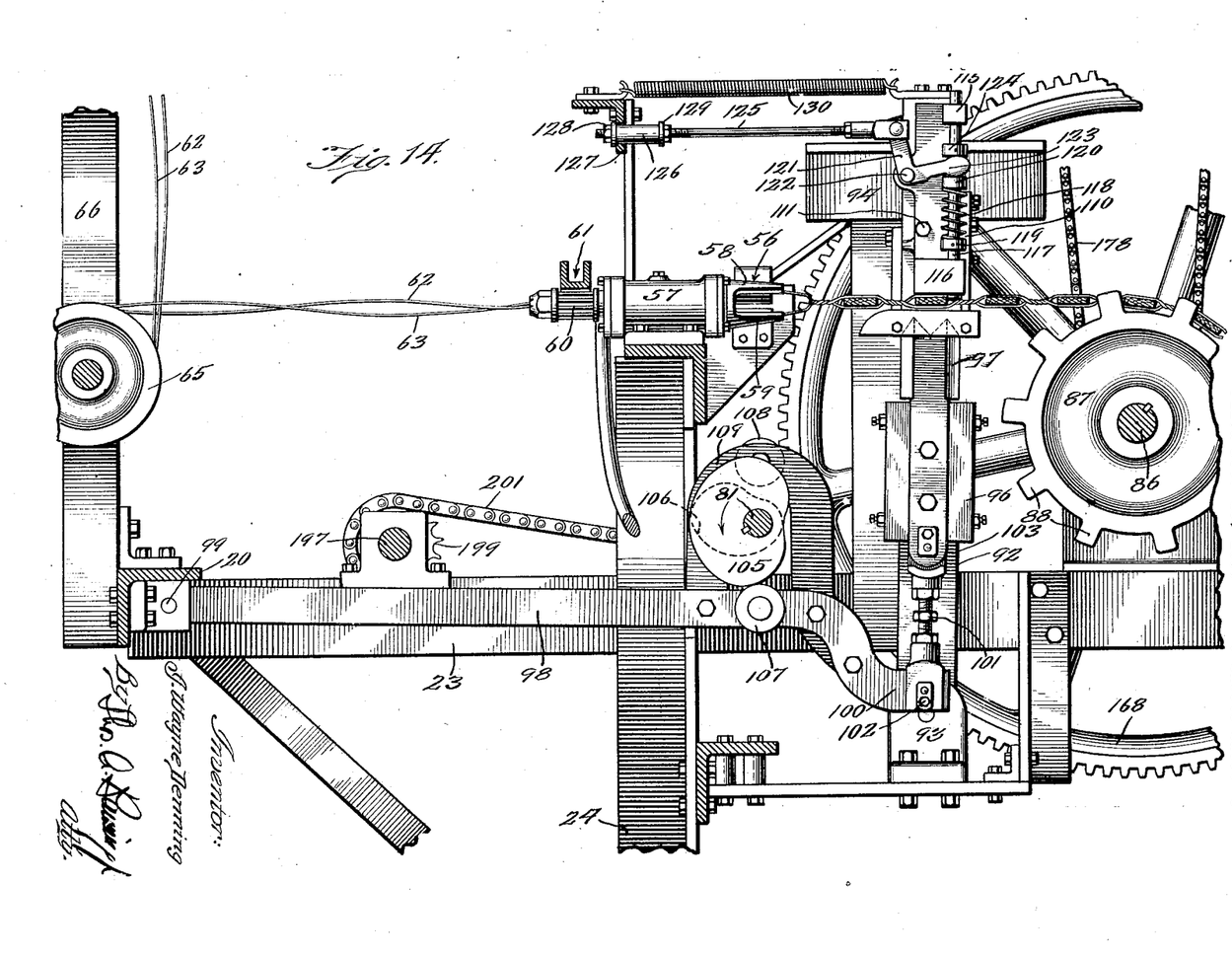
Figure 14 shows a view similar to that of Figures 12 and 13 with the exception that the pointer is just ready to disengage from the slat which has been pointed, whereby the pointer will drop back and engage the next slat.

In the right hand or weaving side of the machine, there are located a series of coiler heads 56 coresponding to the pairs of strand wires which are to be woven into the fabric. The detailed construction of these coiler heads is to a certain extent optional, but the coiler heads illustrated in the drawings are of desirable construction. Each of them includes a shaft journaled in a block 57, said blocks being mounted on a suitable part of the frame of the machine. Each coiler head is bifurcated at its working end as best shown in Figures 12, 13 and 14 so as to provide the fingers or lugs 58 and 59. These lugs are properly spaced apart to accommodate the thickness of the slat between them, so that by arresting the movement of the coiler heads so that their slots all lie in the same horizontal plane, the slat can be projected between and through them as will be evident especially from an examination and comparison of Figures 1, 7, 12, 13, and 14.

The back end of each coiler head shaft carries a pinion 60, and a reciprocating rack bar 61 is located immediately above and meshes with all of these pinions 60. By shifting the rack bar back and forth the pinions are all rocked harmoniously back and forth with corresponding rotation of the coiler heads first in one direction and then the other.

Each coiler head is provided with a longitudinally extending strand wire hole through each of its lugs 58 and 59; and at the pinion ends these strand wire holes mesh together. Consequently, it is possible for the two strand wires 62 and 63 to feed through the coiler head and through the individual lugs 58 and 59 as best evident from examination of Figures 7, 8, 12, 13, and 14. Thus the alternate back and forth rotations of the coiler heads will twist together the strand wires at positions intermediate between the consecutive slats.

Figure 2:
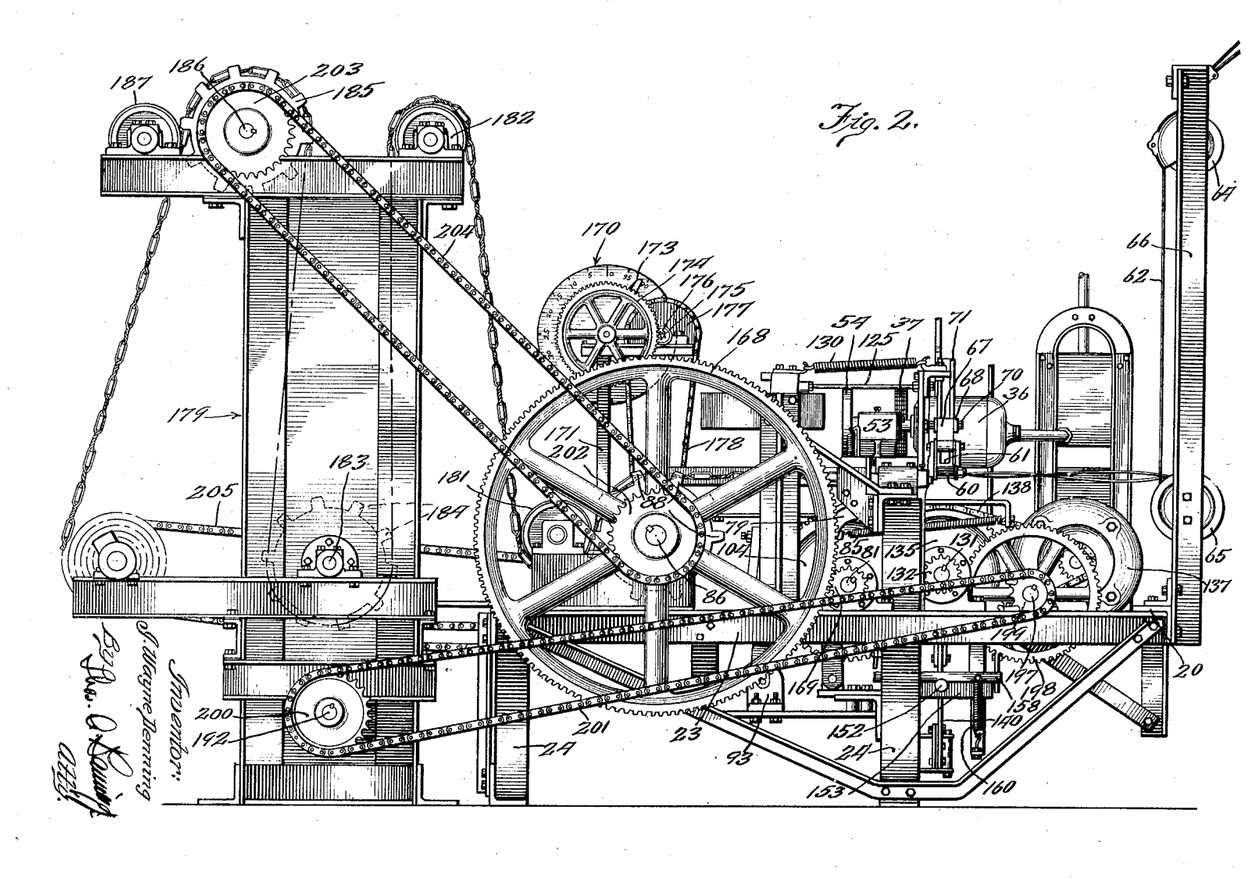
Figure 2 shows a side elevation corresponding to Figure 1, looking towards the weaving side of the machine, the paint vat and associated parts being shown in place.

The strand wires are conveniently delivered in pairs over the rollers 64 and 65 carried by a vertical frame 66 at the incoming end of the weaving side of the machine as best shown in Figures 1 and 2. The strand wires are preferably given three-quarters of a turn around the rollers 65 and are then headed straight into the coiler heads as best shown in Figure 2 so as to thereby avoid tendency for the strand wires to become disengaged with the pulleys 65 as they are rapidly twisted back and forth with the coiler head reciprocations.

The rack bar 61 is provided on its top face with a bracket 67 (see Figure 1) to which there are pivotally connected a pair of links 68 and 69, by means of the pin 70. The other ends of said links are pivotally connected to the upper end of a swinging arm 71 (see Figures 1 and 18), the same comprising a pair of channel bars placed flange to flange as best shown in Figure 1. The lower end of this bar 71 is suitably pivoted to the frame. There is a cam block 72 (see Figure 19) which swings the arm 71 back and forth on said pivot point, thereby reciprocating the rack bar in harmony.

Mounted on a suitable frame bar is a shock absorber or snubber 73 of familiar type such as is used on automobiles, etc., and preferably of the hydraulic principal. The same includes an arm 74 (see Figure 18) which extends upwards and is pivotally connected to a link 75 (see Figures 1, 18, and 19). This link 75 is slotted as shown at 76 in Figure 18 to receive the pin 77 of the arm 71. There is thus established a certain amount of lost motion between the back and forth swings of the rack bar and the operating engagements of the snubber; but the slot 76 is so positioned that the snubber becomes effective shortly before the end of rack bar travel in each direction. In this way the shock incident to stopping the rack bar and coiler heads is largely reduced and practically eliminated.

Figures 7, 8:
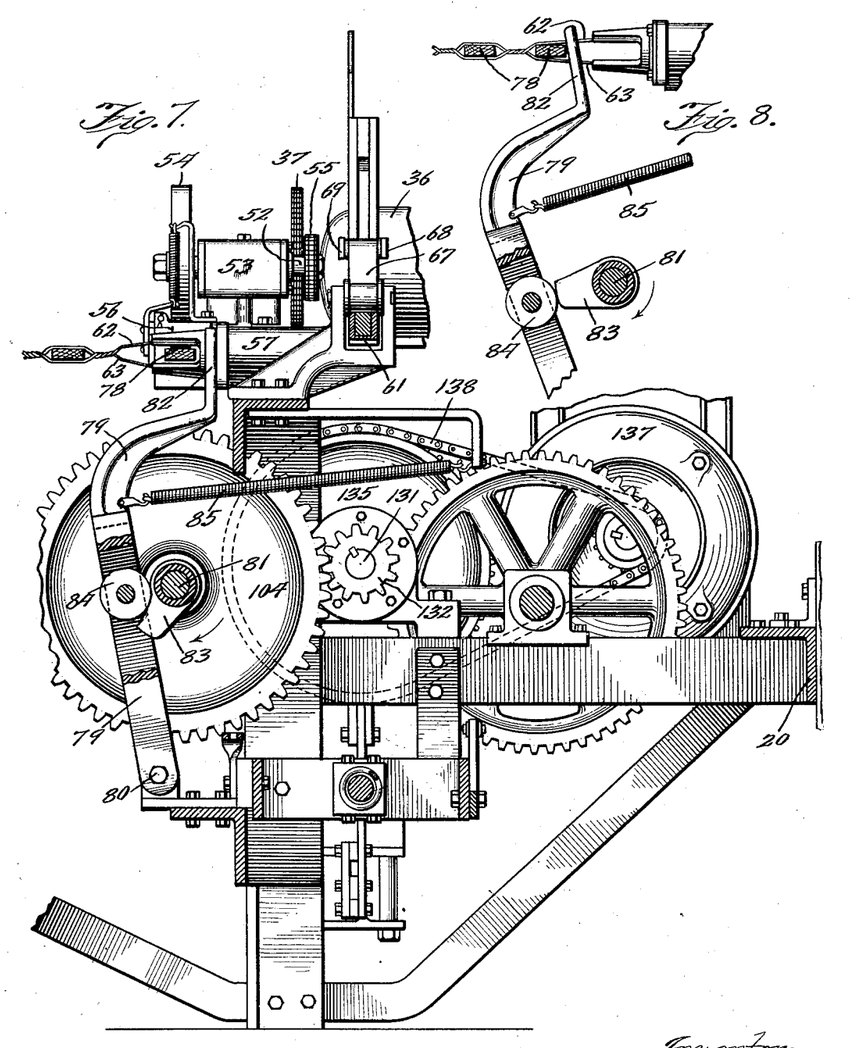
Figure 7 shows a fragmentary section on the line 7—7 of Figure 1, looking in the direction of the arrows, and it shows the slat pull-off mechanism in its initial position.
Figure 8 shows a fragmentary view of a portion of the mechanism of Figure 7, the slat pull-off shoe having been forced over so as to advance the slat.

After the placement of each slat in position as indicated in Figures 1 and 7 in particular, such slat being indicated at 78, it becomes necessary to advance the slat sidewise—that is, parallel to the strand wires and fence—a sufficient distance to clear the coiler head jaws before the coiler heads are rotated. This condition is illustrated by comparison of the positions of the slat in Figures 7 and 8. The strand wires and the woven fence are being continuously drawn away from the coiler heads by the pull out sprocket presently to be described, but I have provided means for operating directly upon the slat 78 so as to forcibly shift the same from the position of Figure 7 to that of Figure 8. This means includes one or more arms 79 pivoted to the frame of the machine at the point 80 in advance of a shaft 81. The upper end of each of these arms 79 is provided with a finger or projection 82 which stands back normally at a position directly behind the newly introduced slat 78, and the arms 79 as shown in Figure 1 are located between the coiler heads. The shaft 81 is driven in synchronism with the machine movements and carries a cam lug 83 in position to engage a roller 84 on each of the arms 79. As the shaft 81 rotates in the direction of the arrows in Figures 7 and 8, the arm 79 is periodically vigorously forced to the left so as to quickly shift the slat 78 away from the jaws of the coiler heads. A spring 85 is provided for retracting each of the arms 79 when released.

Figures 4, 5, 6, 18:
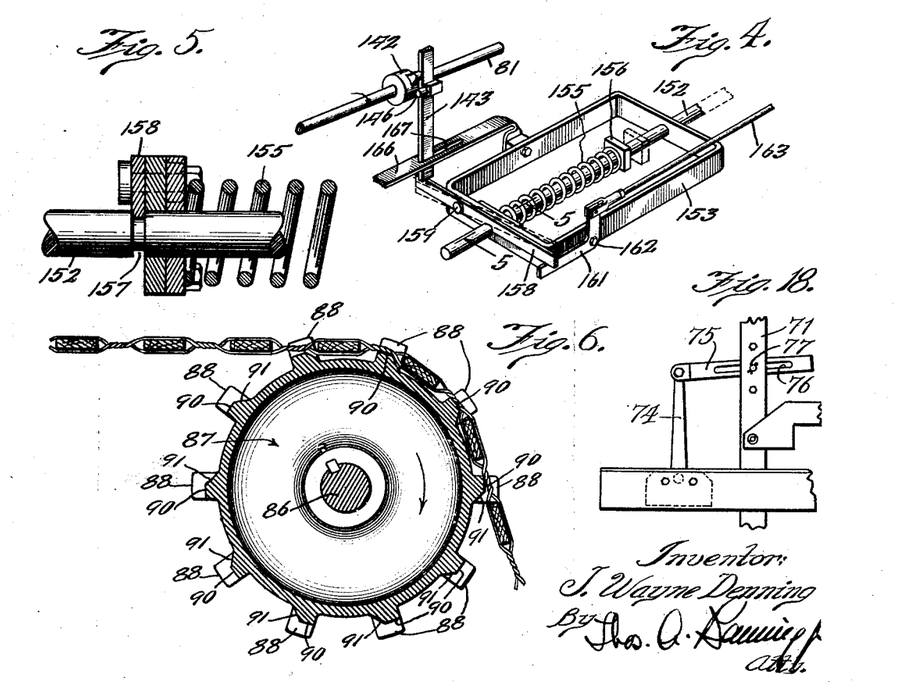

In the weaving portion of the machine, there is a pull-off shaft 86 (see Figures 1, 2, 6, 12, 13, and 14, in particular). This shaft is driven in harmony with the operations of the rest of the machine and at uniform speed. On the shaft 86 there is located a sprocket wheel 87 (see Figure 6 in particular) corresponding to each pair of stand wires. Each of these sprockets has the pairs of teeth 88 projecting from its periphery and located at peripheral spacings corresponding to the spacings between the consecutive slats. These pairs of teeth or lugs 88 are provided with the intermediate notches 89 which are best shown in Figure 1 and which accommodate the strand wires between them, said notches extending down to the position of the lug surfaces 90 upon which the inter-coiled strand wires rest as the woven fence passes over the sprocket as shown in Figure 6. Consequently, these inter-coiled strand wires are supported at an exact definite radius with respect to the shaft 86.

It is also noted that on their front or advancing sides the surfaces 90 are beveled inwardly towards the center as shown at 91 in Figure 6 so that the inter-twisted portions of the strand wires are properly accommodated where they draw together and away from the edge of the slat, thus permitting the faces of the teeth 88 to make direct and square contact against the edges of the slats as clearly shown in Figure 6.

It is thus evident that the sprocket construction is such that a direct pull pressure is communicated from the teeth 88 to the edges of the slats without interference from the inter-coiled portions of the strand wires; and furthermore said inter-coiled portions are directly supported at an exact radius from the shaft 86.

It will be understood that the pull-off sprocket rotates continuously at uniform speed and at the proper rate to pull-out the fence a distance exactly equal to the center-to-center spacing of the fence measured from one slat to the next, this travel being performed for each operation of the rack-bar and coiler heads.

The pointing mechanism is shown in detail in Figures 11, 12, 13, 14, 15, and 16. The same includes a swinging arm 92 whose lower end is pivoted to a bracket 93 secured to the frame of the machine as shown in Figures 12, 13, and 14 in particular. The upper end of the arm 92 works within a slot in one flange 94 of an angle bar which is secured to the frame of the machine, said slot extending in the direction of fence travel so that the arm 92 can swing back and forth parallel to the direction of fence travel.

The upper portion of the arm 92 carries a fixed die 95 which occupies a position above the end of the slat. There is a slide block 96 slidably mounted on the bar 92, and said slide block carries at its upper end a movable die 97 which cooperates with the fixed die 95 to trim the end of the slat when the slide block 96 is forced upwardly.

An arm 98 is pivoted to the frame of the machine at the point 99, the extreme outer end of said arm 100 occupying a position close to the lower pivoted end of the bar 92. Said outer end 100 is connected to the slide block 96 by means of a link including an adjustment screw 101 so that the length of said link can be adjusted in order to cause the movable die 97 to travel to the desired upper limit of movement when the arm 98 is actuated. The link 101 is pivoted to the end 100 of the arm 98 at the point 102 and is also pivoted to the block 96 at the point 103. Consequently, the necessary angularity in the movement of the parts is taken care of.

There is a shaft 81 (see Figures 12, 13, and 14, in particular) which rotates in the direction of the arrows in said figures. Cam blocks 105 and 106 are secured to this shaft. A roller 107 on the arm 98 engages the cam block 105 and another roller 108 on a yoke 109 connected to the arm 98 engages the cam block 106. The two cam blocks are so shaped that the arm 98 is positively shifted up and down during the revolution of the shaft 81, thereby positively moving the slide block 96 of the pointing mechanism up and down. The shaft 81 is timed to make one revolution for each picket delivered and woven into the fence.

Figures 15, 16, 17:
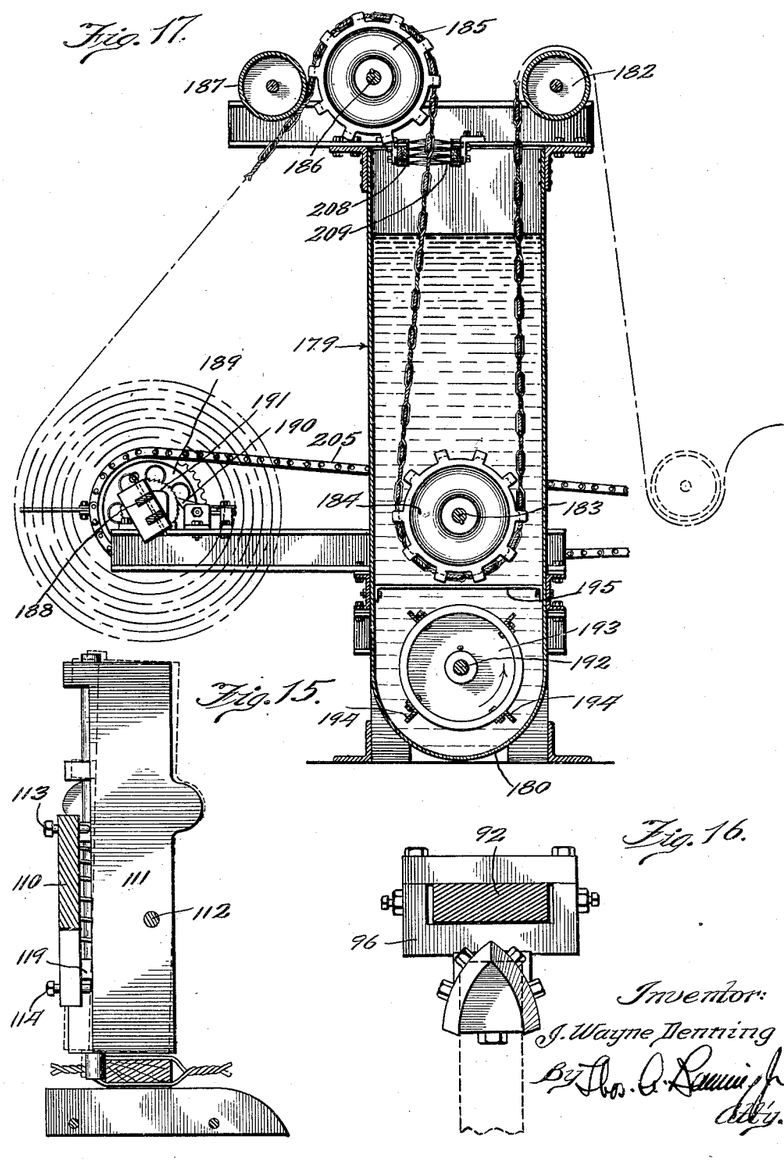
Figure 15 shows a fragmentary section on the line 15—15 of Figure 11, looking in the direction of the arrows, and it shows by dotted lines the manner in which the slat engaging pin can be adjusted so as to compensate for different thicknesses or widths of slat.
Figure 16 shows a fragmentary section on the line 16—16 of Figure 11, looking in the direction of the arrows.
Figure 17 shows a vertically transverse section through the paint vat and associated parts.

The upper end of the arm 92 also carries a block 110, (see Figure 11 in particular) and a plate 111 is pivoted to the block 110 by the pin 112 (see Figures 11 and 15). The block 110 carries a pair of screws 113 and 114 which bear against the edge of the plate 111 so that by tightening one of said screws and loosening the other the plate 111 can be tilted to a greater or less extent as shown by the dotted lines in Figure 15.

The plate 111 carries the upper and lower lugs 115 and 116 within which a pin 117 is slidably mounted; and a spring 118 bears at its lower end against the collar 119 on said rod and at its upper end against a collar or abutment 120 which is slidably mounted on the pin 117. Consequently, the pin 117 is normally projected downwards into the position of Figures 11, 12, 13, and 15, but the pin can be forced up into the position of Figure 14 in order to disengage from the slat.

There is a bell-crank 121 pivoted to the plate 111 at the point 122. Said bell-crank has a bifurcated arm 123 which works between the collar 120 and another collar 124 which is fixed to the pin 117. The other arm of this bell-crank connects by a link 125 to a block 126 which is slidably mounted in a fixed member such as the frame bar 127. Nuts 128 and 129 serve to permit adjustment of the block 126 on the rod 125 so that the position of engagement and arrest of movement of the rod 125 can be adjusted. A spring 130 connects between the upper end of the arm 92 and a stationary part of the machine.

The operation of this pointing mechanism is as follows:

The spring 130 swings the arm 92 back into a position where the lower end of the pin 117 stands in the line of travel of the oncoming slat. As the fence is drawn over on to the sprocket and the slat to be advanced, the pin 117 is engaged and the arm 92 is thereby compelled to swing with the slat movement so as to keep the parts in registry. During this movement the shaft 81 brings the cams 105 and 106 around so as to force the arm 98 upwards, thereby forcing the movable die 97 up to trim the picket. During these operations the forward swing of the arm 92 is causing the block 126 on the rod 125 to advance to the position where it is arrested in its movement by the frame bar 127, and the further swing of the arm 92 takes place with the rod 125 in fixed position, thereby compelling the bell-crank 121 to rock into the position of Figure 4 and slightly farther. This draws the pin 117 upwards against the force of the spring 118 until finally said pin disengages from the slat. Thereupon the spring 130 will draw the arm 92 quickly backwards to its initial position during which movement the pin 117 will again move down into position to engage the next on-coming slat. The operation will then be repeated.

It will be noted particularly from Figure 16 that the dies are frequently so formed as to point the picket. In order to make provision for proper centering of the dies with respect to pickets of different widths, the plate 111 can be adjusted on the pivotal point 112 (see Figure 15) as already explained, so that when the pin 117 engages the edge of the slat the dies will be properly centered with respect to the slat.

Figure 3:
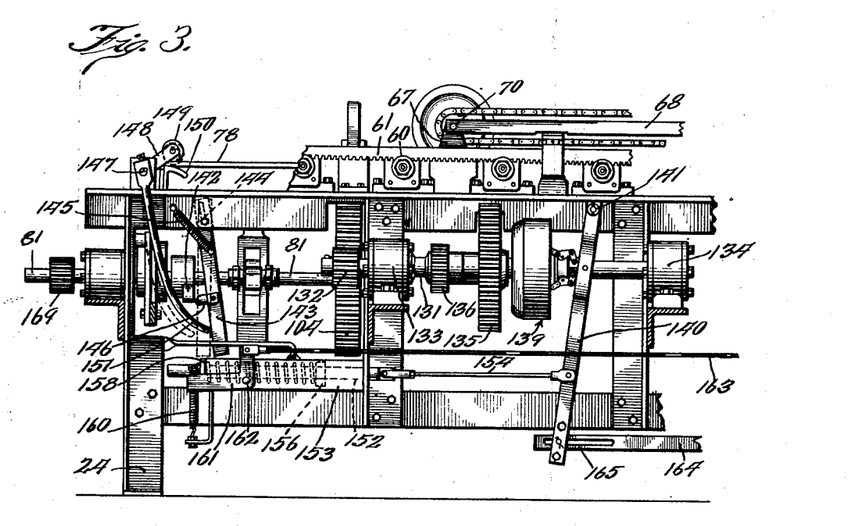
Figure 3 shows a fragmentary section substantially on the line 3—3 of Figure 1, looking in the direction of the arrows, and illustrates the stopping mechanism by which the operation of the machine is automatically stopped in case the slat does not come to the correct position for the coiling operations.

Referring particularly to Figures 3, 4, and 5, there is a drive shaft 81 which has already been referred to in connection with the cams which operate the picket pointing mechanism and in connection with the cams which operate the slat advancing arms 79. This shaft 81 is also shown in Figures 2 and 3. It carries a large gear 104 by which it is driven.

There is another shaft 131 lying parallel to the shaft 81 and having a pinion 132 which meshes with the gear 104 (see Figures 2, 3, and 7 in particular). The shaft 131 is journaled in ball bearings 133 and 134 which are best shown in Figure 3.

Journaled on the shaft 131 there is a unit which includes a sprocket 135 and a pinion 136. These can turn freely on the shaft 131 but can be clutched to said shaft by the mechanism presently to be explained.

A main driving motor 137 is mounted on the frame parallel to the shaft 131 and is drivingly connected to the sprocket 135 by a chain 138 (see Figures 1, 2, and 7 in particular). It will be noted that the shaft of the motor 137 lies at right angles to the shaft of the motor 36 already referred to, this circumstance being due to the fact that the two motors are chain drive connected to their respective driven shafts, and the use of bevel gears for this drive is thereby eliminated.

There is a clutch 139 (see Figure 3 in particular) along side of the sprocket 135, and when said clutch is engaged it connects the sprocket 135 drivingly to the shaft 131. An arm 140 has its upper end pivotally connected to the frame at the point 141 and by swinging said arm back and forth it engages and disengages the clutch 139. When the arm 140 is at the lefthand position when viewed as in Figure 3, the clutch is engaged, whereas when said arm is swung to the right said clutch is disengaged.

The shaft 81 already referred to completes one revolution for each slat woven into the fence. Mounted upon said shaft there is a cam block 142 (see Figures 3 and 4). A bar 143 has its upper end pivotally and slidably connected to the frame of the machine by the pin and slot connection shown at 144 in Figure 3. A spring 145 normally swings this bar towards the left and into the dotted line position of Figure 3, in which position the cam block 142 will strike against a finger 146 on the bar 143, thereby depressing said bar, the rotation of the shaft 81 being in the direction of the arrow in Figure 4. On the other hand if the bar 143 is held over in the full-line position of Figure 3 when the cam block 142 comes around, the finger 146 of the bar 143 will not be engaged and therefore said bar will not be depressed.

There is a short shaft or pin 147 journaled to the frame of the machine at a point near the position which the end of the picket occupies when fully inserted ready for weaving into the fence. This shaft 147 carries an arm 148 having a roller 149, which roller occupies a position above a stationary shoe 150 (see Figure 3); and as the picket 78 is run into position its end will be forced between the shoe 150 and the roller 149, thereby raising said roller and tilting the finger 148 and rocking the shaft 147.

There is an arm 151 which extends down from the shaft 147 and has its lower end engaging the bar 143 already referred to. Consequently, when a picket is fully inserted into position as in Figure 3, this arm 151 is swung to the right into the full line position and retains the bar 143 in the full line position so that the pin 146 on said bar will not be engaged by the cam block 142 as it comes around. On the other hand if a picket is not fully inserted in place the roller 149 will not be raised and the arm 151 will not be swung over into the full line position and consequently the pin 146 will stand in the path of the cam block 142 as it comes around and therefore the bar 143 will be forced down by said cam block.

There is a rod 152 which is slidably mounted in a frame member 153 which is carried by the frame of the machine. This rod 152 connects with the clutch bar 140 by a link 154 so that the back and forth movements of the rod 152 are communicated to the clutch bar 140. A spring 155 surrounds the rod 152 and one end of said spring presses against the frame 153 and the other end of the spring presses against a block 156 on the rod 152. The tendency of said spring therefore is to force the rod 152 towards the right with consequent disengagement of the clutch.

The rod 152 is provided with a notch 157 (see Figure 5). A latch bar 158 is pivoted to the frame member 153 at the point 159; and a spring 160 normally draws the latch bar 158 down into the full line position of Figure 4, where said latch bar will engage the notch 157 and prevent the pin 152 from being forced to the right.

The bar 143 already referred to when in the dotted line position stands above the end of the latch bar 158 (see Figure 3). Consequently the forcing down of the bar 143 by the rotation of the cam block 142 will result in tilting the latch bar 158 and consequent disengagement of the pin 152 so that the clutch will be thrown out. This happens in case a slat does not come to the correct position in the machine. On the other hand if the slat does come to the correct position, the bar 143 is tilted over into the full line position of Figure 3 so that no disengagement takes place.

There is a bell-crank 161 pivoted to the frame member 143 at the point 162 so that by tilting said bell-crank the latch 158 is raised and the pin 152 is disengaged irrespective of the rotation of the cam block 142.

A rod 163 extends from the bell-crank 161 to a point where it can be conveniently manipulated by the operator of the machine so as to throw the machine out of service manually.

There is another bar 164 which has a pin and slot connection 165 with the lower end of the bar 140. The machine may thus be restored to service by manually forcing the bar 164 to the left in Figure 3. This will serve to engage the clutch and will also move the pin 152 over to the position where the latch 158 will engage the notch 157, thereby retaining the clutch in engagement until it is again disengaged.

Preferably a plate 166 is secured to the frame 153, said plate 166 having a slot 167 which receives the lower portion of the bar 143 and guides the same while permitting it to swing with the necessary degree of freedom.

The pull-off shaft 86 on which the pull off sprocket is mounted carries a large gear 168 which is engaged by a pinion 169 on the shaft 81 already referred to. Consequently, the pull off sprocket is driven in harmony with the other portions of the machine.

Preferably there is provided a counter or length indicator, for keeping a record of the amount of the performance of the machine. In the construction illustrated, this includes a disk 170 carried by a standard 171 mounted on the frame of the machine. Said standard 171 carries a shaft 172 upon which there is an indicating pointer 173 (see Figure 2); and the shaft 172 also carries a gear 174. The standard 171 also carries another shaft 175 having a pinion 176 which meshes with the gear 174; and a sprocket 177 is also provided on the shaft 175. This sprocket 177 is driven by a chain 178 which in turn is driven by a sprocket on the pull-off shaft 86 (said sprocket being hidden in Figures 1 and 2). It is thus evident that the indicating pointer 173 will turn in exact harmony with the pull-off sprocket and therefore in harmony with the amount of fence drawn from the machine. Suitable markings may be provided on the face of the disk 170 to read in feet, yards, or rods as shown in Figure 2.

There is a paint vat 179 located in position to receive the fence as it is delivered from the sprocket and paint said fence uniformly before it is reeled. This paint vat is shown in Figures 2 and 17 in particular. It is a relatively narrow and deep vat as shown in Figure 17, closed at its sides and ends and provided with a semi-circular bottom 180. The top of said vat is open. Adjacent to the position of the pull-off sprocket, there is journaled a drum 181 so that the fence delivered from the sprocket passes under this drum and then up as best shown in Figures 2 and 17. Incidentally, the drum 181 is also located close to the sprocket so that in case of breakage or cutting of the fence at a point beyond the drum 181, the fence will nevertheless, be kept properly engaged with the pull-off sprocket.

Coming from the drum 181 the fence passes up and over another drum 182 which is journaled at the adjacent upper edge of the paint vat. There is another shaft 183 which extends lengthwise in the central portion of the paint vat and a series of sprockets 184 under which the fence passes and then rises up and passes over sprockets 185 on a shaft 186 at the other or delivery side of the top of the paint vat. A roller 187 is journaled close to the sprockets 185 and serves to keep the fence properly meshed with said sprockets at all times.

From the roller 187 the fence passes down and is reeled on to suitable bars 188 which may be of any suitable construction and the details of which do not constitute a portion of the present invention. Suffice it to state that the bars 188 are driven by a sprocket 189, and that a pawl and ratchet arrangement 190—191 prevents backward or unreeling movement of the fence.

In the lower semi-circular portion 180 of the vat there is a longitudinally extending shaft 192 on which are located a series of disks 193, and a series of angle bars 194 are located on the edges of these disks 193. Consequently, upon rotation of the shaft 192 in the direction of the arrow in Figure 17, the angle bars 194 will move around with a paddling action and thus keep the paint mixture in the necessary state of agitation.

There is a series of bars 195 placed across the paint vat beneath the sprockets 184 and above the rotary agitator. These bars 195 serve to prevent the fence from dropping down into the rotary agitator in case of accidental breakage or loosening of the fence. This is of importance since manifestly if the fence should become entangled with the rotary agitator, the machine would soon become jammed.

Behind and parallel to the shaft 131 is another shaft 197 (see Figures 1 and 2). This shaft carries a gear 198 which meshes with the pinion 136 on the shaft 131 (see Figures 2 and 3).

The outer end of the shaft 197 carries a sprocket 199 which drives a sprocket 200 on the outer end of the agitator shaft 192 through the medium of a chain 201. It will thus be noted that the agitator in the paint vat is continuously driven as long as the motor 137 is functioning and irrespective of whether the clutch 139 is engaged or disengaged. This is important for the reason that it insures a continuous agitation of the paint even when the weaving operations are not going on, and thus prevents settling of the pigment as long as the motor 137 is in operation.

The outer end of the pull-off sprocket shaft 86 carries a sprocket 202 (see Figures 1 and 2). This sprocket drives a sprocket 203 on the outer end of the shaft 186 at the upper end of the paint vat through the medium of a chain 204. Thus the sprocket shaft 186 at the upper end of the paint vat is exactly timed with respect to the pull-off sprocket shaft 86 which is important since the fence meshes with sprockets on both of said shafts.

The sprocket 189 for the bundling bars 188 is driven by a chain 205 (see Figures 1, 2, and 17), which chain 205 is driven by a slip connection from a suitable shaft in the body of the machine (shown in partly obscured view in Figure 1). This is the shaft 206 which is driven through the medium of a slip clutch 207 from another suitable shaft in the train of gearing.

In order to wipe any excess paint from the fence as it rises out of the paint vat 179, I have provided a pair of steel brushes 208 and 209 supported by suitable brackets in the upper portion of the paint vat. These brushes wipe against the opposite faces of the fence as it rises from the paint bath and before the fence reaches the sprocket 185.

While I have herein shown and described only a single embodiment of the features of my present invention, still I do not intend to limit myself thereto except as I may do so in the claims.

I claim:

1. In a slat fence machine for the production of fence having transverse slats and longitudinally extending strand wires twisted together between said slats alternately in opposite directions, the combination of a coiler head for each pair of strand wires mounted for back and forth rotation on axes coincident with the pairs of strand wires, and provided with longitudinally extending through openings for the accommodation of the strand wires, pinions connected to said coiler heads, a reciprocating rack bar meshing with said pinions, means for introducing slats in position between the strand wires, means for reciprocating the rack bar, a shock absorber, and a connection between said shock absorber and said rack bar reciprocating means operative effectively to dampen shock incident to stoppage and reversal of movement of the rack bar and coiler heads, substantially as described.

2. In a machine for the production of slat fence having transverse slats and longitudinally extending pairs of strand wires twisted together between the slats, the combination of a coiler head for each pair of strand wires suitably formed for the delivery of the strand wires into position at the side faces of the slat, means for rotating said coiler heads alternately in opposite directions including a reciprocating operating bar, means for feeding the slats into position between the strand wires, means for operating said coiler head reciprocating means, and means for absorbing and dampening shock incident to reversal of movement of the coiler heads and the coiler head reciprocating means, substantially as described.

3. In a machine for the production of slat fence having transverse slats and longitudinally extending pairs of strand wires twisted together between the slats, the combination of a coiler head for each pair of strand wires suitably formed for the delivery of the strands wire into position at the two faces of the slat, means for rotating the coiler heads alternately in opposite directions including a reciprocating operating member, a shock absorber having a swinging arm member, and a link connection between the reciprocating member of the coiler head operating means and the swinging member of the shock absorber, substantially as described.

4. In a machine for the production of slat fence having transverse slats and longitudinally extending pairs of strand wires twisted together between the slats, the combination of a rotatable coiler head for each pair of strand wires suitably formed for the delivery of the strand wires at the opposite faces of a slat, means for rotating said coiler heads alternately in opposite directions, pull-off means for withdrawing the completed fence and including a drum mounted for rotation on an axis transverse with respect to the strand wires, gear and sprocket means for driving said pull-off mechanism, a motor for driving said gear and sprocket means and having its shaft extending parallel to the axis of the pull-off means, means for introducing slats into position transverse with respect to the strand wires and including a feeding disk mounted for rotation on an axis transverse with respect to the slats, a driving motor for said feeding means having its shaft lying transverse with respect to the slats, and a chain and sprocket drive between said last named motor and the slat feeding disk, whereby independent drives are established for the slat feeding means and the other mechanisms, and whereby the shafts of said motor drives lie at right angles to each other, substantially as described.

5. In a machine for the production of slat fence having transverse slats and longitudinally extending pairs of strand wires twisted together between the slats, the combination of a rotatable coiler head for each pair of strand wires suitably formed for the delivery of the strand wires at the opposite faces of a slat, means for rotating said coiler heads alternately in opposite directions, pull-off means for withdrawing the completed fence and including a drum mounted for rotation on an axis transverse with respect to the strand wires, gear and sprocket means for driving said pull-off mechanism, a motor for driving said gear and sprocket means and having its shaft extending parallel to the axis of the pull-off means, means for introducing slats into position transverse with respect to the strand wires and including a feeding disk mounted for rotation on an axis transverse with respect to the slats, a driving motor for said feeding means having its shaft lying transverse with respect to the slats, and driving connections between the last named motor and the slat feeding disk, substantially as described.

6. In a machine for the production of slat fence having transverse slats and longitudinally extending pairs of strand wires twisted together in between the slats, the combination of a rotatable coiler head for each pair of strand wires suitably formed for the delivery of strand wires at the opposite faces of the slat, means for rotating said coiler heads alternately in opposite directions, pull-off means for withdrawing the completed fence and including a drum mounted for rotation on an axis transverse with respect to the strand wires, means for introducing slats into position transverse with respect to the strand wires and including a feeding disk mounted for rotation on an axis transverse with respect to the slat, independent driving motors for the slat feeding disk mechanism and for the other mechanisms, and suitable connections between said driving motors and the respective mechanisms, substantially as described.

7. In a machine for the production of slat fence having transverse slats and longitudinally extending pairs of strand wires twisted together between the slats, the combination of a rotatable coiler head for each pair of strand wires suitably formed for the delivery of the strand wires at the opposite faces of a slat, means for rotating said coiler heads, means for introducing slats into position adjacent to the strand wires, and means for pulling off completed fence, said pull-off means including a shaft mounted for rotation on an axis parallel to the slats, a disk on said shaft in alignment with each pair of strand wires, each disk being provided with radially projecting peripheral teeth spaced around the periphery of the disk at spacing corresponding to the spacing between consecutive slats of the completed fence, each of said teeth being centrally notched for the reception of the strand wire portions between consecutive slats, the notches extending downwardly only part way in the teeth to thereby directly support the strand wires on the bottom portions of said notches prior to contact of the slats with the disks between the teeth, and the advancing edges of the teeth being cut backwardly at the lower edges of the notches therein to accommodate the twisted strand wires at the front edges of the slats and insure driving contact of the advancing tooth portion against the slat edges, substantially as described.

8. In a machine for the production of slat fence having transverse slats and longitudinally extending pairs of strand wires twisted together between the slats, means for pulling out completed fence including a shaft lying parallel to the slats and transversely with respect to the strand wires, disks on said shaft positioned in alignment with the strand wires, teeth on the peripheral portions of said disks extending radially outward at spacings corresponding to the spacings of the consecutive slats, each of said teeth being centrally notched for the accommodation of the strand wires, the disks between the teeth being of radius to permit accommodation of the slats without contact with said disk portions, and the lower front edge portions of the teeth notches being cut backwardly to accommodate the twisted wires at the adjacent edges of the slats to thereby permit direct contact of the advancing tooth faces against the slat edges, substantially as described.

9. A pull-off device for the purpose specified, including a series of disks mounted for rotation on a common axis, said disks being spaced along said axis to correspond with the spacing of the pairs of strand wires, said disks being provided with radially outwardly projecting U-shaped teeth having the lower forward portions of said teeth cut backwardly to accommodate the twisted strand wires and permit direct contact of the side portions of the teeth against the edge of a slot, the disks between the teeth being not of greater radius than the natural supporting positions of the slats with strand wires stretched between consecutive teeth, substantially as described.

10. In a machine for the production of slat fence having transverse slats and longitudinally extending pairs of strand wires twisted together between the slats, the combination of means for feeding said slats into position transversely with respect to the strand wires, means for twisting together the strand wires between the consecutive slats, means for pulling out completed fence at substantially uniform rate, a vertical paint vat, a pull-off drum at the delivery side of said paint vat, drums for delivering the completed fence from the pull-off mechanism into and downwardly into the lower portion of the paint vat, an agitator in the lower portion of the paint vat, means for driving the delivery drum at the delivery side of the paint vat harmoniously with the pull-off mechanism aforesaid, a driving motor for all of said parts, clutch means between said driving motor and said parts, and a direct driving connection from said motor to said agitator, substantially as described.

11. In a machine of the class described, the combination of means for feeding slats into position transverse with respect to the length of the fence, means for feeding longitudinal strand wires into position across said slats, means for twisting said strand wires intermediate between said slats, a support for the end of a slat fed into position, a movable member in relation to said support to receive contact with the end of the slat fed into position and be raised thereby, a driving motor for said parts, clutch means intermediate between said driving motor and said parts, means tending to release the clutch means, means for making ineffective said releasing means during each slat feeding operation, and means connected to the movable member aforesaid for making ineffective said clutch releasing means when a slat occupies proper position with respect to the slat end support aforesaid, substantially as described.

12. In a machine of the class described, the combination of means for feeding longitudinal strand wires into place in pairs, means for feeding slats into position across said strand wires, means for driving said parts in timed relationship with respect to each other, a slat end support in position to receive and support the end of a slat fed into position as aforesaid, clutch means intermediate between the driving means and said parts to control operation thereof, means tending to disengage said clutch means, means operating synchronously with the slat feeding operations tending to cause said disengaging means to function, and means for making ineffective said last named means when the slat occupies proper position with respect to the end support aforesaid, substantially as described.

13. In a machine of the class described, the combination of means for feeding longitudinal strand wires, means for feeding transverse slats into position across said strand wires, means for pulling out the completed fence, and means for pointing the ends of the slats so in position and in the completed fence as it is pulled out, said pointing means including a rock member located in position to rock back and forth in harmony with the fence travel, pointing means carried by said rockmember, means for engaging the edge of a slat as the same is advancing during the pull out operation, and means for adjustably connecting said engaging means with the rock member, to thereby permit adjustment of said rock member with respect to the slat position thereby allowing centering of the pointing mechanism with respect to the slat being pointed, substantially as described.

14. In a machine of the class described, the combination of means for producing slat fence including longitudinal strand wires and transverse slats woven thereinto, and means for pointing the ends of the slats including a reciprocating member reciprocating back and forth parallel to the travel of the fence being produced, pointing means carried by said reciprocating member, means for operating said pointing means harmoniously with respect to the fence operations, and means for adjusting the reciprocating member with respect to the slat being pointed to thereby permit centering the pointing means with respect to the slat being pointed, substantially as described.

J. WAYNE DENNING.